(12) United States Patent
Wendorf et al.

(10) Patent No.: US 7,257,821 B2
(45) Date of Patent: Aug. 14, 2007

(54) ACCESSING AN IN HOME NETWORK THROUGH THE INTERNET

(75) Inventors: Roli Garg Wendorf, Cortlandt Manor, NY (US); Johan Gerhard Herman Reuzel, Eindhoven (NL); Rob Theodorus Udink, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1227 days.

(21) Appl. No.: 09/826,241

(22) Filed: Apr. 4, 2001

(65) Prior Publication Data

US 2002/0078259 A1    Jun. 20, 2002

(30) Foreign Application Priority Data

Apr. 4, 2000 (EP) .................................. 00201237
Dec. 22, 2000 (EP) .................................. 00204811

(51) Int. Cl.
*G06F 9/00* (2006.01)
(52) U.S. Cl. ............... 719/328; 725/105; 725/135; 725/143
(58) Field of Classification Search ........... 719/328, 719/318; 375/8; 209/217; 725/151, 105, 725/135, 143
See application file for complete search history.

(56) References Cited

U.S. PATENT DOCUMENTS

| | | | |
|---|---|---|---|
| 6,169,725 B1 * | 1/2001 | Gibbs et al. | 370/216 |
| 6,182,094 B1 * | 1/2001 | Humpleman et al. | 715/513 |
| 6,456,892 B1 * | 9/2002 | Dara-Abrams et al. | 700/83 |
| 6,457,066 B1 * | 9/2002 | Mein et al. | 719/330 |
| 6,460,030 B1 * | 10/2002 | Ludtke | 707/3 |
| 6,519,594 B1 * | 2/2003 | Li | 707/10 |
| 6,725,281 B1 * | 4/2004 | Zintel et al. | 719/318 |

* cited by examiner

*Primary Examiner*—William Thomson
*Assistant Examiner*—Phuong N. Hoang

(57) ABSTRACT

A communication system includes a HAVi-based in-home network 140 and a remote device 110 operative to communicate with an intermediate device 130 of the in-home network via Internet. The remote device loads a HAVi applet (Havlet) 238 for controlling at least one of the in-home devices using HAVi. The remote device also loads an HAVi API (HJA) emulator 310 which emulates HJA. The HJA emulator provides an interface for the Havlet and communicates with a module 330 in the intermediate device. The intermediate device includes the actual HJA 236 which provides the actual interface functionality for the HAVi functions used by the Havlet. The interface functionality is provided by controlling the intermediate device and/or communicating with other in-home device(s) according to application messages of the in-home application protocol. The intermediate device loads the module for enabling communication between the HJA emulator in the remote device and HJA loaded in the intermediate device, giving a substantially transparent communication path between the portable application program in the remote device and the HJA in the intermediate device.

12 Claims, 3 Drawing Sheets

ACCESSING AN IN HOME NETWORK THROUGH THE INTERNET

The invention relates to accessing an in-home network, in particular a HAVi based network, from a remote device, specifically via the Internet.

With the arrival of new in-home network technologies, such as IEEE 1394 and Bluetooth, the likelihood of a broad use of such networks for communication between CE devices, in particular Audio/Video devices, has increased. For CE devices, focussing on A/V, the higher level protocols (application protocols) have recently been described by HAVi (Home Audio/Video interoperability architecture). The success of wide area networks, in particular Internet and mobile phone systems, has led to a desire to access in-home networks from remote locations. This would, for instance, enable a user to program his home VCR from his office PC or to view a security camera on a WAP phone. It is known to provide remote access to an in-home network via an intermediate device, usually a PC, which is equipped with interfaces to both the in-home and the wide area network. In a situation where both networks provide the same application protocols, the intermediate device plays the role of a bridge or of a router. In a situation where the application protocols are different, the intermediate device also converts the application protocols of the wide area network to those of the in-home network and vice versa. Such a device is usually referred to as a gateway.

In the case of connecting an in-home network, like HAVi, to a remote Internet device, such a remote device is not equipped with HAVi protocols, nor with application programs, such as HAVi applets, for controlling HAVi devices. It is desired that HAVi devices can be controlled from remote devices, like an office PC or a WAP phone.

It is an object of the invention to enable communication from a remote device to devices in an in-home network in a user-friendly manner. It is specifically an object to provide a method and communication system wherein the communication between the remote device and the in-home network can be established with little involvement of the user.

To meet the object of the invention, the communication system includes an in-home network and a remote device; the in-home network including a plurality of in-home devices operative to communicate using predetermined in-home protocols including an in-home application protocol; at least one of the in-home devices, being referred to as intermediate device, also being operative to communicate with the remote device using predetermined remote protocols including a remote application protocol which differs from the in-home application protocol;

the remote device being operative to load a portable application program for controlling at least one of the in-home devices by calling an Application Program Interface (API) of the in-home application protocol; and load an API emulator operative to provide a callable interface for functions of the in-home application protocol, and to supply this API functionality by communicating with a module in the intermediate device using the remote protocols;

the intermediate device including: an API operative to provide interface functionality for the functions of the in-home application protocol by controlling the intermediate device an/or communicating with other in-home device(s) according to application messages of the in-home application protocol; and the module for communicating between the API emulator in the remote device and the API in the intermediate device, establishing a substantially transparent communication path between the portable application program in the remote device and the API in the intermediate device.

In this way, the portable application program developed for use in the in-home network, and usually already present in this network and familiar to the user, can be simply loaded in the remote device. Consequently, the same functionality and the same user interface also get available outside the in-home network. The remote device and the intermediate device keep on communicating using the remote protocols. The interface (API) required for the application program in the remote device is provided to the program by emulating it. The emulated functions are performed by communicating to a module in the intermediate device via the remote protocols. In this process all relevant information is transferred remote device to the intermediate device (and vice versa). In the intermediate device, a conventional API is present (and performed in the normal way by communicating to the in-home devices using the in-home protocols). The module ensures that this API is called in the appropriate way to fulfill the call made by the application program to the API emulator in the remote device.

According to the measure of the dependent claim 2, the emulating of the application protocol API takes place by actually executing the application protocol in a conventional way (only the application protocol and not the underlying in-home protocols) and emulating calls from the application protocol to the underlying in-home messaging system protocol. Application protocols for in-home network define many callable messages for controlling devices or obtaining information from devices. A typical API to the HAVi application protocols offers several hundreds of calls. The application protocol encodes/decodes these messages and ensures transmission by calling the underlying messaging protocol. A messaging protocol typically provides less functionality and as such has much simpler interface (Messaging System API). In the case of HAVi, the Messaging System API provides approximately 20 callable functions. By emulating the messaging API and transferring the information present at the messaging level via the remote protocols, the complexity of emulation is considerably reduced.

These and other aspects of the invention will be apparent from and elucidated with reference to the embodiments shown in the drawings.

DETAILED DESCRIPTION

The description will be given for a HAVI in-home network. It will be appreciated that the same concepts also apply to other in-home networks. The HAVi home network consists of a set of audio and video devices such as TVs, VCRs, modems, web proxy devices, cameras, and CD players. The home network can also include information processing or storage device like PCs. The devices are interconnected by IEEE 1394, and may be distributed throughout the home. All HAVi compatible devices contain HAVi control software, and communicate with each other in a distributed, peer-to-peer fashion to exchange control information and audio/video content. Thus, the HAVi network operates as a distributed computing environment.

The HAVi control software residing on the various devices in a home network works together to provide a set of services to the applications 10 through the HAVi API (Application Program Interface at the level of the application protocol). The applications (also referred to as application programs) are clients of the HAVi network. It is expected that a user will interact with the HAVi network through an application that provides a friendly user interface and accesses the HAVi API on the user's behalf. A special form of an application is a portable application written in Java. Such an applet, suitable for use within an HAVi environment, is referred to as a HAVi applet, or Havlet. Shown are three Havlets 12.

Figure 1:
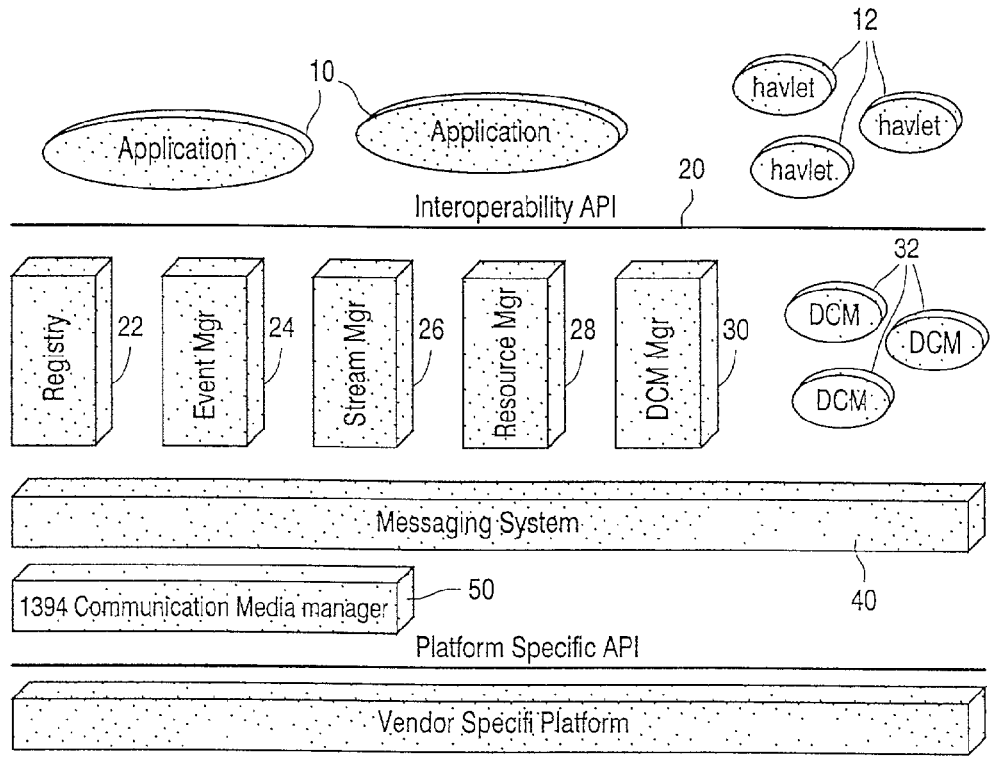
FIG. 1 shows the HAVI architecture.

The HAVi architecture provides the Interoperability API 20 (also referred to as application protocol API) shown in FIG. 1, and constitutes the middleware between the Vendor Specific Platform (devices and software) and the applications. It is similar to an operating system that controls low level devices in a computing system, and provides a set of services to applications. Some of the main services provided in HAVi are the Registry 22 for recording all software elements on the node, Event Manager 24 to record and send events when certain conditions are reached, Stream Manager 26 to manage connections and isochronous (streaming) data transfer, and Resource Manager 28 to manage device allocation. The DCM Manager 30 is responsible for managing DCMs (Device Control Modules) 32 or abstract devices.

The various software modules on different nodes communicate with each other through the Messaging System layer 40. Direct, proprietary IEEE 1394 bus access may be done through the 1394 Communication Media Manager 50. Each software module capable of sending and receiving HAVi messages is a "HAVi Object" and is called a Software Element.

Application Execution in HAVi

Figure 2:
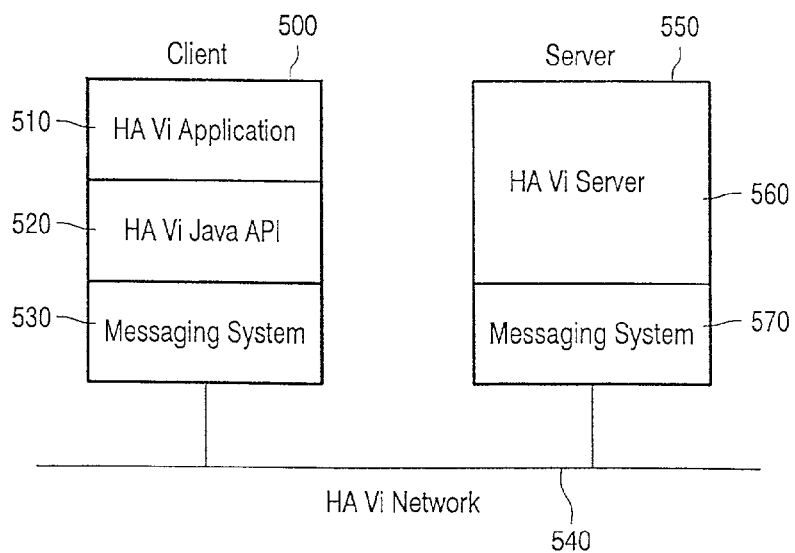
FIG. 2 shows the interaction between a HAVi client en server.

HAVi clients (end users and software applications) can access HAVi services present on any device connected to the HAVi home network by making HAVi API calls. HAVi services are accessed through typical client-server interactions as shown in FIG. 2. The HAVi Java application 510 in the client 500 includes calls to the HAVi Java API 520. These calls are sent to the proper HAVi server through the Messaging System 530 and the HAVi network 540 (operating on top of IEEE 1394). The server 550 includes a HAVi Server 560 which receives the information through its Messaging System 570 and extracts the original HAVi Java API call, carries it out, and returns the result to the client application through the reverse path.

Figure 3:
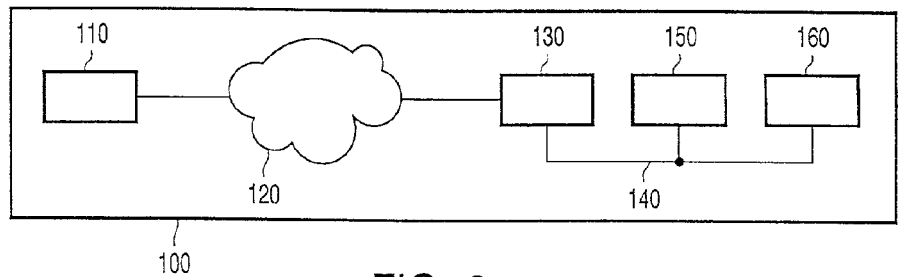
FIG. 3 shows a block diagram of the system according to the invention.

FIG. 3 shows a communication system 100 according to the invention. The system includes at least one device 110, referred to as remote device, connected via a wide area network 120 to a device 130 on the in-home network 140. This device 130 is referred to as intermediate device. Shown are two further devices, 150 and 160, on the in-home network 140. The system will be described in more detail for the situation wherein the wide area network is Internet, and the in-home network is HAVi operating on top of the IEEE 1394 bus. It will be appreciated that also other wide area networks may be used. In principle, instead of a wide area network 120 also a second in-home network may be used. In such a scenario, two different types of in-home networks are coupled via the intermediate device 130. This scenario will not be described further, however persons skilled in the art will be able to apply the principles described here also to such a system. Instead the focus will be on accessing the in-home network from a remote device across the Internet.

Figure 4A:
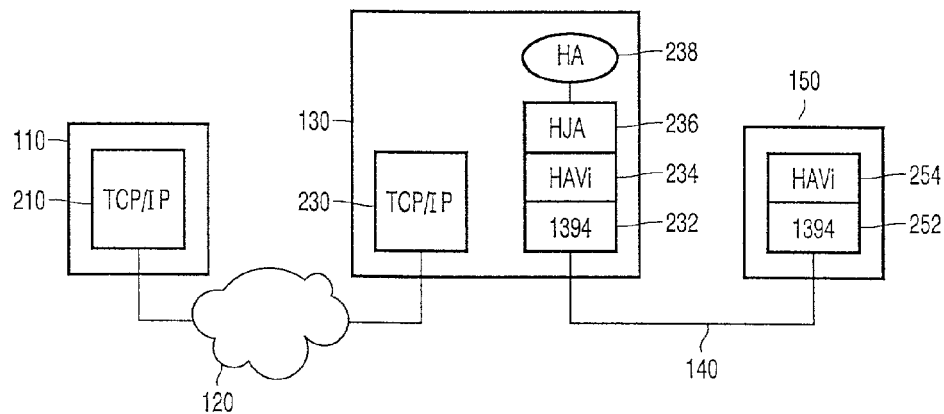
FIG. 4 shows the prior art protocol architecture and the architecture according to the invention.

FIG. 4A shows an outline of the prior art protocol stacks. The remote device 110 includes conventional Internet protocols, like TCP/IP 210. These protocols include also the lower level telecom protocols, like V90, which are not shown. The intermediate device includes a corresponding Internet protocol stack 230. In addition it supports the communication protocols for communication via the in-home network 140. Shown are the 1394 protocols 232 (usually mainly implemented in hardware) and the HAVi protocols 234. At least one of the devices in the in-home network can be controlled by an associated application program, written in portable code, like Java. The application program communicates with the associated device using application protocol messages specific for the in-home digital network. If the program is coded in Java, it is usually referred to as an applet. In line with this, an applet designed for communicating using HAVi application protocol messages is referred to as Havlet. In the example described here in detail, the application program is a HAVi Java Applet (Havlet) sending/receiving HAVi messages via calls to the HAVi Java API (HJA). HJA is a set of Java classes and packages whose interfaces and behaviour are defined by the HAVi standard. It concerns two things:

Providing a way to present a user interface (HAVi Level 2 UI), i.e. the packages org.havi.ui and org.havi.ui.event.

Providing access to the different HAVi infrastructure elements (system and non-system software elements), i.e. all packages except org.havi.ui and org.havi-.ui.event. Havlets are the HAVi equivalent of the Java Applet concept. They can be uploaded to a HAVi FAV (Full A/V device) with a display. Those FAVs have to provide (their own implementation of) the HJA, so the Havlet may assume those classes to be available.

The portable application program (Havlet) may be located in the device it controls (referred to as associated device) or may access this device via the in-home network. The HAVi protocols can be accessed via the HJA interface 236 as shown in FIG. 4A. This interface enables the Havlet 238 to communicate with the other devices in the in-home network 140. Of course, if the Havlet 238 controls the same device as on which the Havlet is being executed, then the HJA ensures that the instructions issued by the Havlet are executed by the device. The proprietary way of locally executing the HJA functions is not shown. Further, one more in-home device 150 is shown with corresponding 1394 protocols 252 and HAVi protocols 254. Not shown is the proprietary way of executing any HAVi messages by the device 150.

Figure 4B:
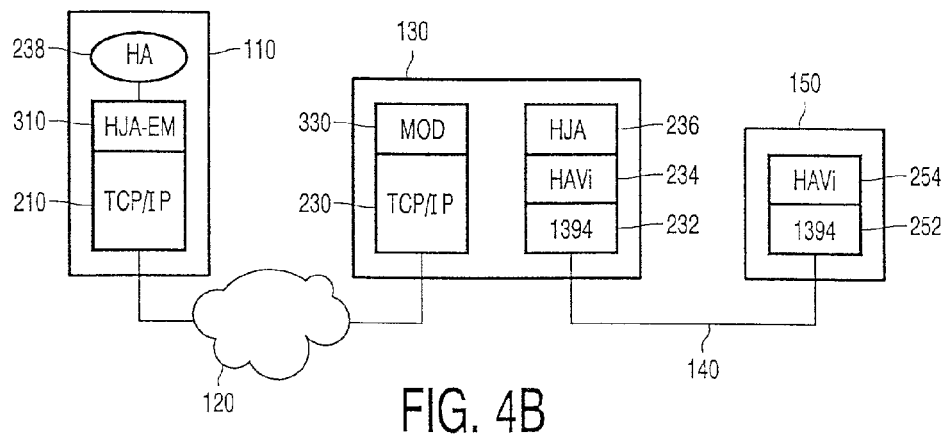

FIG. 4B shows an outline of the protocol stack according to the invention. The Havlet 238 is now loaded into the remote device 110. It is assumed that the remote device can execute the Havlet. This is the case for a conventional Internet device equipped with a browser capable of executing or interpreting Java applets. In addition, the specific HAVi functionality, accessible via the HAVi Java API (HJA) needs to be made accessible for the Havlet on the remote device 110. To this end, a HJA emulator 310 is loaded on the remote device 110. It offers the HJA interface to the HAVi applet 238. Unlike the real HJA layer 236 as shown in FIG. 4A, the HJA emulator 310 does not issue HAVi messages directly to a HAVi device. Instead, The HJA emulator 310 ensures that the interaction between itself and the Havlet 238 results in a same interaction with the real HJA 236, which actually provides the functionality. So, the HJA emulator 310 'mimics' the HJA layer 236 by reporting the fact that HJA was called by the HAVi applet 238 and details about the call (like parameters) to the intermediate device 130. The intermediate device 130 is loaded with an additional module 330 which retrieves the information supplied to it by the HJA emulator 310 and issues the corresponding call to the HJA interface 236. This will normally result in message(s)

being sent to a HAVi device. It will be appreciated that information/messages from a HAVi device will be transferred back in reverse sequence. Preferably the exchange of information between the HJA emulator 310 and the module 330 takes place via standard Internet protocols, like using TCP/IP. Advantageously, the information to be passed on to the intermediate device 130 is embedded in XML messages, using the SOAP technique of Microsoft, which enables embedding an API in XML messages and as such establishing a form of remote procedure calling mechanism. In such a system, the module 330 retrieves the API information from an XML message and calls the HJA 236. In the reverse sequence, the module 330 is triggered by the HJA 236 and embeds the supplied information in an XML reply message which is sent to the HJA emulator 310. The module 330 can also pass on information, like events, sent by the controlled device in an asynchronous manner. Also this information is packed in XML messages. The HJA emulator 310 in response to receiving an XML message triggers the Havlet 238 as if it had been directly triggered by the HJA 236.

Figure 5:
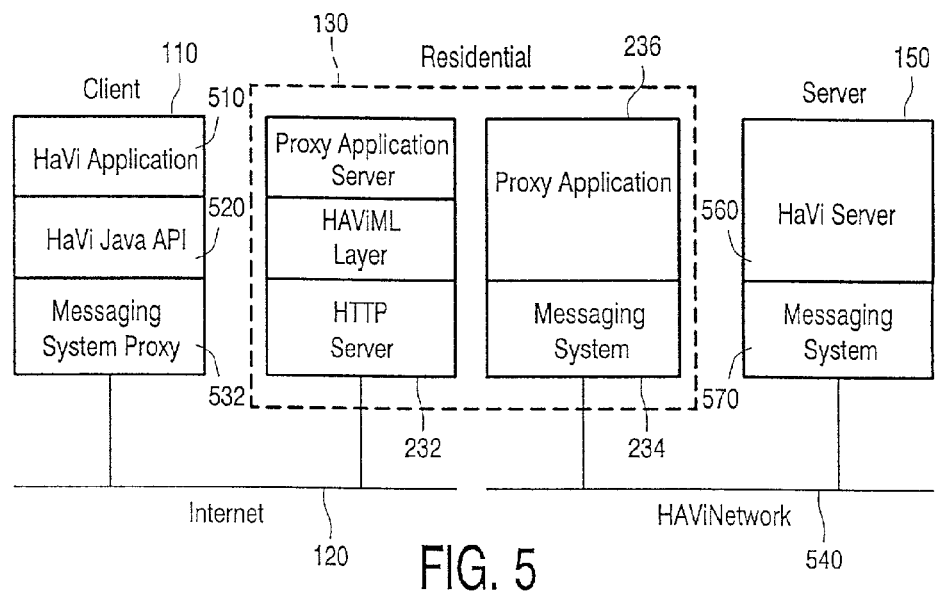
FIG. 5 illustrates providing the HAVi API by emulating the Messaging System's API.

FIG. 5 shows a preferred embodiment for emulating the API (in this case the HAVi Java API). Instead of directly emulating all functionality provided by the HAVI Java API (i.e. translating all calls directly (e.g. using XML/SOAP)), the remote device 110 in its role as a Client includes part of a conventional HAVi Java API implementation. As described for FIG. 1, calls to the HAVi API 20 are translated to calls to the HAVi Messaging System 40. The API of the Messaging System includes considerably less calls, making it easier to emulate the Messaging System API. As shown in FIG. 5, the client application in the remote device 150 is connected to the HAVi home network through the internet, and the client Messaging System is replaced by a Messaging System Proxy 532. The client side processing is similar to that described for FIG. 2, except that the Messaging System Proxy layer 532 encodes the Messaging System API into Internet messages, preferably using XML and SOAP, and places it on the internet 120, preferably using HTTP. On the home side, a Residential Gateway arrangement 130 is required with an internet server, as well as a connection to the HAVi home network 540. The Residential Gateway 130 is a HAVi device that has a special module called RemoteAccess that allows access to remote HAVi applications. The elements of this module are, preferably, an HTTP Server 232, a HAViML layer 332, and an Application Proxy Manager 334. These elements receive the message from the internet, remove the XML and SOAP encoding, and send the decoded Messaging System API call to the proper Application Proxy 236. This preferred method exploits the structure of the HAVi architecture layers and has a relatively simple way of translating the entire HAVi API by adapting the HAVi Messaging System with the existing technologies XML and SOAP. All other HAVi Java API calls are translated into binary data and carried in the payload parameter of some Messaging System API call. This method of translating the HAVi API to XML/SOAP is called HAViML (HAVi Markup Language).

Since multiple remote client applications can access the HAVi home network, there may exist multiple Application Proxy elements such that each Application Proxy represents a particular remote application in HAVi. However, there is only one Application Proxy Manager that is responsible for saving the mapping between the remote application and its proxy, and sends the Messaging System API call to the proper Application Proxy. On receiving a Messaging System API call, the Application Proxy 236 sends it to the proper HAVi server 150 through the Messaging System 234 and the HAVi home network 540 in the usual way as described for FIG. 2. The reply is sent back by the HAVi server to the Application Proxy, which sends it to the Application Proxy Manager for routing back to the remote application.

There are several scenarios for making the HAVi related client stack (HAVi application, HAVi Java API, and Messaging System Proxy) available on the client side, including:

Pre-installed client stack: The entire HAVi client stack has to be pre-installed from a web-site or a disk. For instance, the manufacturer of CE devices could make available (e.g. on its Internet site) downloadable programs for controlling its CE devices. In this scenario, an installation is required before running any remote HAVi application for the first time, but once the installation is done, there is no overhead in subsequent executions of the application. A remote access session can be started at any time by sending an initialization message to the Residential Gateway.

Downloading from the Intermediate Device: In this scenario, the HAVi client stack need not be present on the remote side initially. For enabling the downloading of the Havlet and possibly other parts of the client stack from the intermediate device 130 to the remote device 110, advantageously the intermediate device 130 is equipped as an HTTP server. The functionality required for this is well known and not described further. By using the HTTP server, the remote device 110 can simply access and retrieve the Havlet 238 using standard protocols and widely available software. Using such protocols, a browser is required on the client side 110 to connect to the Intermediate Device (Residential Gateway) 130 through its URL. Once this connection is established, preferably the Residential gateway presents a menu of remote applications. When a selection is made, the client stack including the application is downloaded to the client as an applet, and starts executing. For each new application, the entire stack or just the application may be downloaded. The downloaded Havlet may be simple, for instance, only allowing control of (part of) the intermediate device 130. Advantageously, the Havlet enables the user to control several A/V devices and provides a suitable user interface for several A/V devices on the HAVI network. In this way a user can access A/V devices remotely while still using the user interface familiar from controlling the devices at home.

Downloading the Havlet through the Intermediate Device: In addition to the scenario described above, preferably, the intermediate device is capable of downloading the HAVi applet 238 from one of the other devices in the in-home network 140. In this way, for instance a user interface and/or control application program of a VCR, written in portable code, can first be downloaded (or uploaded) to the intermediate device (like a PC or set top box). The functionality for loading a Havlet is standard available in a specific class of HAVi devices, referred to as Full AV device (FAV). Next, the program is loaded into the remote device (for instance located in an office), allowing control of the VCR in exactly the same way as if the user directly operated the device. Also the same user interface may be supplied.

Java API as a browser plug-in:

In this scenario, the HAVi Java API and the Messaging System Proxy are together available as a plug-in on standard browsers. Once the plug-in is loaded, the remote applications can be downloaded from the Residential Gateway or a web-site. In this case the applications can be made available as havlets.

It will be appreciated that the HJA emulator 310 and the module 330 need only be developed once. If they support the full functionality of the HAVi API, they can be used to let any Havlet execute on a remote device. As an alternative to a full-blown HJA emulator 310 or module 330 also restricted implementations may be used, which only provide the functionality required for the specific Havlet 238. In this scenario preferably the HJA emulator 310 is loaded together with the Havlet 238 in the remote device 110. The intermediate device loads the module 330 that corresponds to the Havlet 238.

Getting Started

In order to execute remote HAVi applications, the Residential Gateway HAVi device (intermediate device) must be running in the home, including the RemoteAccess application. When the RemoteAccess application is started, the HTTP Server, the HAViML Layer, and the Application Proxy Manager are started (see FIG. 5). The HTTP server port and handler are initialized, and are waiting to service any incoming requests.

The first step from the client side is to access the Residential Gateway and the HAVi home network from a standard browser, using the URL of the Residential Gateway. Typically, the Residential Gateway will present a menu of available applications. The client selects the desired application. This leads to an upload of the client application, the HAVi Java API layer, and the Messaging System Proxy. When the uploading is completed, the client application starts initializing. Its first interaction with the home server is an initialization message called initRemote. This message causes the Residential Gateway to extract the IP address of the client side. In reply to this message, the ID of the HAVi Messaging System is returned to the client for future reference.

The next initialization step on the client side is to create an application Software Element. A Software Element is a "HAVi Object", capable of sending and receiving messages to other software elements using the HAVi Messaging System. Application software element creation results in the Messaging System call msgOpen to be sent to the home server so that the Messaging System can assign an ID (Software Element ID—SEID) to it. The client side Messaging System Proxy adds the Client URL as an additional parameter in this call. On the server side, an Application Proxy (or a Proxy Software Element) is created, and its SEID is returned by the HAVi Messaging System. The Application Proxy Manager keeps a mapping of this SEID and the Proxy Software Element, and also of the SEID and the client URL. This allows it to send back asynchronous events and replies to the proper client destination. The SEID of the Application Proxy is returned to the client and saved there for future reference. A mapping of the SEID and the Application Software Element is maintained on the client side as well so that the Messaging System Proxy can associate replies with the proper application software elements. Another aspect of software element creation is the association of relevant "listeners" with the software elements, such that a message of a particular type sent to a software element can be handled by an appropriate listener.

Handling Synchronous Havi Api Calls

From the point of view of remote HAVi applications, the handling of HAVi API calls is exactly the same as if the applications were actually connected to a HAVi network. They send and receive messages on a Messaging System proxy, which behaves exactly the same as the normal messaging system.

The transport of HAVi API calls over the internet is preferably done with XML. The interaction between the client and the server is preferably based on a remote procedure call mechanism. Hence preferably SOAP, the emerging standard for remote procedure calls on XML, is used. The XML/SOAP messages are placed on the internet using the HTTP protocol.

The scheme for tunneling HAVi API calls through the internet makes use of the fact that all the information of a HAVi Java API call is already marshalled into binary data and carried in the payload parameter of a Messaging System API call. Hence, the transfer of the entire HAVi Java API over the internet is done by having a translation scheme for the Messaging System API. This reduces the translation of the HAVi Java API (several hundred calls) to the translation of the Messaging System API (approximately 20 calls). All HAVi API calls can be handled in this way except the streaming of isochronous data.

Thus HAViML consists of the Messaging System API, and the initRemote method described earlier, used in the initialization of the remote client. HAViML consists of approximately 20 API calls. Typical methods are MsgSendSimple, MsgSendReliable, MsgSendRequest, MsgOpen, MsgClose, MsgWatchOn, and MsgWatchOff. The Messaging System calls are translated to XML/SOAP for transmission on the internet using HTTP. The transmission of binary data is done with base-64 encoding. An example of this translation for the API call MsgSendRequestSync is shown below:

```
<?xml version="1.0" encoding="UTF-8"?>
<SOAP:Envelope xmlns:SOAP="urn:schemas-xmlsoap-org:soap.v1">
    <SOAP:Body>
        <ns:msgSendRequestSync xmlns:ns="Haviml-namespace">
            <srcSeid>bin.base64: AAAAAAAAAAEBBw==</srcSeid>
            <destSeid>bin.base64: AAAAAAAAAAEAAg==</destSeid>
            <opCode>bin.base64: AAMD</opCode>
            <timeOut>5000</timeOut>
            <bufferIn>bin.base64: AAAAAAAAAAT///7/Aag=</bufferIn>
        </ns:msgSendRequestSync>
    </SOAP:Body>
</SOAP:Envelope>
```

The MsgSendRequestSync function is used for sending HAVi API calls. The operation code of the API call being sent is provided in the parameter <opCode>, and the parameters of the call are encoded in <bufferIn>. The ID of the HAVi server that will process this call is given in <destSeid>, and the ID of the sender is in <srcSeid>. The response to the API call is also coded in XML/SOAP in the Residential Gateway and returned to the client side. The response includes all return parameter names and values, and/or an exception (error) code. A person skilled in the art will be able to design suitable translations for the other API calls.

Handling Asynchronous Events and Replies

Events and asynchronous replies are HAVi Messaging System API calls which are initiated from the Residential Gateway rather than from the remote client. In order to receive these, preferably an HTTP Server is used at the client side. These calls are preferably also encoded in XML/SOAP as described in the previous section. When an asynchronous event or reply is to be sent to a remote application client, the corresponding Application Proxy receives the event or reply first. It forwards this to the Application Proxy Manager. This manager translates the event or reply into XML/SOAP and sends it to the HTTP Server for the corresponding remote application. The HTTP Server passes control to a HAViML Client object. The HAViML Client object extracts the API call from the XML/SOAP message and calls the receiveMsg method on the Messaging System Proxy. The Messaging System Proxy maintains a mapping of the application SEID and its Software Element. It uses this mapping to forward the event or reply to the correct Software Element, and hence to the application. The Residential Gateway uses the client address information stored in the startup phase to access the proper remote application.

Handling Plug-and-Play

Plug-and-play is the ability to remove and add devices in the home network without bringing down the entire network. In HAVi, a new device configures itself, is registered, acquires an ID, and its presence can be notified to any devices already present on the home network. Similarly, when a device is removed or switched off, its information is also removed, and its removal can be notified to existing devices if desired. These actions do not require user intervention on behalf of the devices being added or removed. With HAViML, some of these capabilities are available to the remote applications, but some require enhancements to the system. The most common scenarios are described below.

If one of the devices in the HAVi home network is added or removed, the handling is exactly the same as before. The remote application can put a WatchOn on that device, and be informed when it disappears, or request an event when a new device becomes available. If the Residential Gateway is removed, then all the currently running remote applications are also removed. If a watch has been placed on any of these applications, it will be handled correctly. If a Residential Gateway is added, it is handled in the same way as for a normal HAVi network, since no remote applications can be present at this stage.

If the remote client device is disconnected, there is no automatic way for the HAVi network to be informed. Additional protocols are required between the Residential Gateway and the remote client such as "I'm alive" messages at regular intervals. Similarly, if one of the applications on the client side goes down, but its proxy on the server side is still available, there is no automatic way of finding this out without additional protocols. The addition of a remote client or application is taken care of through the HAViML initialization mechanism.

Terminating a Remote Havi Application

Terminating a remote HAVi application includes removal of the Application Software element on the remote client side, and its Proxy Application Software Element on the home server side. All related references to these software elements also have to be removed, such as the SEID and remote address (client URL). Removal of a remote application is done when its software element makes a msgClose call on the messaging system. This could happen, for instance, when an application completes.

Classes

The HJA has different types of classes:
Classes that can be implemented in a platform independent way.
Classes that cannot be implemented in a platform independent way.

Figure 6:
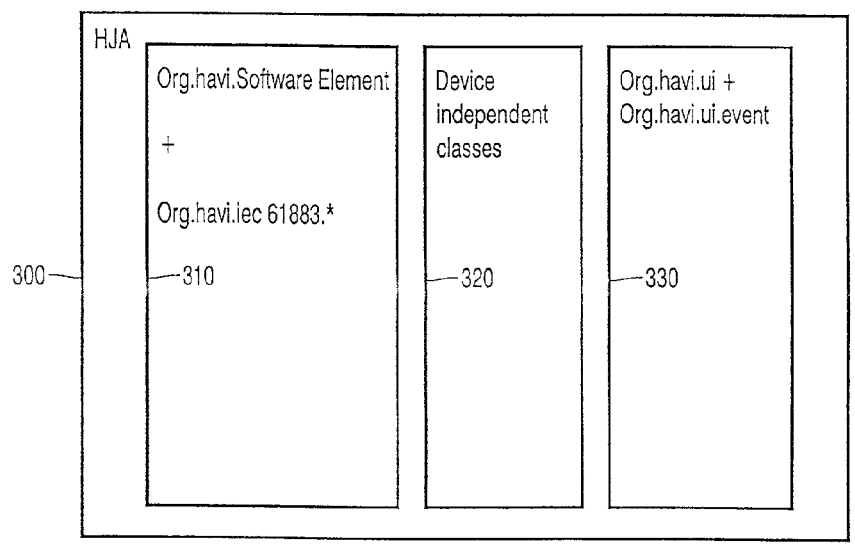
FIG. 6 shows a subdivision in HJA parts.

In practice, quite some HJA classes on the FAV itself (especially for the L2 User Interface functionality) will be mostly implemented in a proprietary way to make them as efficient as possible. When uploading of a Havlet onto a non-HAVi device 110, the non-HAVi device has to provide the HJA to that Havlet by using the HJA emulator 310. The user interface is typically then executed locally on the remote device. The HJA emulator 310 can simply provide the UI part of the HJA by using an implementation built on Sun's Java AWT (Abstract Windowing Toolkit). The AWT package is normally available on most Internet devices (PCs with Java). For the non-UI part of HJA, i.e. the access to the HAVi infrastructure, all HAVi Java classes can be implemented in a platform independent way, with the exception of the Software Element class, and classes in the org.havi.iec61883 package. This subdivision of the HJA functionality is shown in FIG. 6. The total set of functionality is indicated by 400, the UI related part by number 430, the part which can be implemented in a device independent way by number 420, and the part which is device dependent by number 410.

As described above, the remote device in addition to downloading the Havlet 238, also has a choice in obtaining the HJA emulator 310. For instance, the remote device could:
Build it into the browser
Upload it from a web site
Upload it from the HAVi intermediate device, or through the HAVi intermediate device from one of the other HAVi devices in the in-home network Such an option may be chosen for the entire HJA emulator, but a choice may also be made independently for the HJA components indicated in FIG. 3 (the UI part, the platform independent and dependent packages).

The invention claimed is:

1. A communication system including an in-home network and a remote device:
the in-home network including a plurality of in-home devices operative to communicate using predetermined in-home protocols including an in-home application protocol; at least one of the in-home devices, being referred to as intermediate device, also being operative to communicate with the remote device using predetermined remote protocols including a remote application protocol which differs from the in-home application protocol;
the remote device being operative to load a portable application program for controlling at least one of the in-home devices by calling an Application Program Interface (API) of the in-home application protocol;

and load an API emulator operative to provide a callable interface for functions of the in-home application protocol, and to supply this API functionality by communicating with a module in the intermediate device using the remote protocols;

the intermediate device including:
  an API operative to provide interface functionality for the functions of the in-home application protocol by controlling the intermediate device an/or communicating with other in-home device(s) according to application messages of the in-home application protocol; and
  the module for communicating between the API emulator in the remote device and the API in the intermediate device, establishing a substantially transparent communication path between the portable application program in the remote device and the API in the intermediate device.

2. A communication system as claimed in claim 1, wherein the in-home protocols include a messaging protocol. hierarchically below the in-home application protocol, and the API emulator being operative to supply the API functionality by executing the in-home application protocol in the remote device end supplying the in-home application protocol an interface to the messaging protocol by communicating with the module in the intermediate device using the remote protocols.

3. A communication system as claimed in claim 1, wherein the in-home application protocols are Home Audio/Video interoperability (HAVi) based.

4. A communication system as claimed in claim 1, wherein the portable application program is Java based.

5. A communication system as claimed in claim 1, wherein the remote protocols are based on Internet protocols.

6. A communication system as claimed in claim 1, wherein the API emulator and the module communicate using a remote procedure calling protocol.

7. A communication system as claimed in claim 1, wherein information to be communicated between the API emulator and the module are described using a mark-up language.

8. A communication system as claimed in claim 1, wherein the remote device is operative to load the portable application program and/or API emulator from the intermediate device.

9. A communication system as claimed in claim 8, wherein the remote device is operative to load the portable application program and/or API emulator from an in-home device, other than the intermediate device, via the intermediate device.

10. A remote device for use in a communication system as claimed in claim 1, the remote device being operative to load a portable application program for controlling an in-home device by calling an Application Program Interface (API) of an in-home application protocol; and load an API emulator operative to provide a callable interface for functions of the in-home application protocol, and to supply this API functionality by communicating with a module in an intermediate device using predetermined remote protocols including a remote application protocol which differs from the in-home application protocol; the intermediate device being on an in-home network including a plurality of in-home devices operative to communicate using predetermined in-home protocols including the in-home application protocol.

11. An intermediate device for use in a communication system as claimed in claim 1, the intermediate device being on an in-home network including a plurality of in-home devices operative to communicate using predetermined in-home protocols including an in-home application protocol: the intermediate device also being operative to communicate with a remote device using predetermined remote protocols including a remote application protocol which differs from the in-home application protocol; the Intermediate device including:
  an Application Program Interface (API) of the in-home application protocol operative to provide interface functionality for functions of the in-home application protocol by controlling the intermediate device an/or communicating with other in-home device(s) according to application messages of the in-home application protocol; and
  a module for communicating between an API emulator in the remote device and the API in the intermediate device, establishing a substantially transparent communication path between a portable application program in the remote device and the API in the intermediate device, where the portable application program is operative to control at least one of the in-home devices by calling an Application Program Interface (API) of the in-home application protocol; and the API emulator is operative to provide a callable interface for functions of the in-home application protocol, and to supply this API functionality by communicating with the module in the intermediate device using the remote protocols.

12. A method of communicating in a communication system including an in-home network and a remote device; the in-home network including a plurality of in-home devices operative to communicate using predetermined in-home protocols including an in-home application protocol; at least one of the in-home devices, being referred to as intermediate device, also being operative to communicate with the remote device using predetermined remote protocols including a remote application protocol which differs from the in-home application protocol; the method including:
  in the remote device, loading and executing a portable application program for controlling at least one of the in-home devices by calling an Application Program Interface (API) of the in-home application protocol; and loading and executing an API emulator operative to provide a callable interface for functions of the in-home application protocol, and to supply this API functionality by communicating with a module in the intermediate device using the remote protocols; and
  in the intermediate device, loading and executing:
    an API operative to provide interface functionality for the functions of the in-home application protocol by controlling the intermediate device an/or communicating with other in-home device(s) according to application messages of the in-home application protocol; and
    the module for communicating between the API emulator in the remote device and the API in the intermediate device, establishing a substantially transparent communication path between the portable application program in the remote device and the API in the intermediate device.

* * * * *